July 26, 1938.  R. C. FRYER  2,124,693

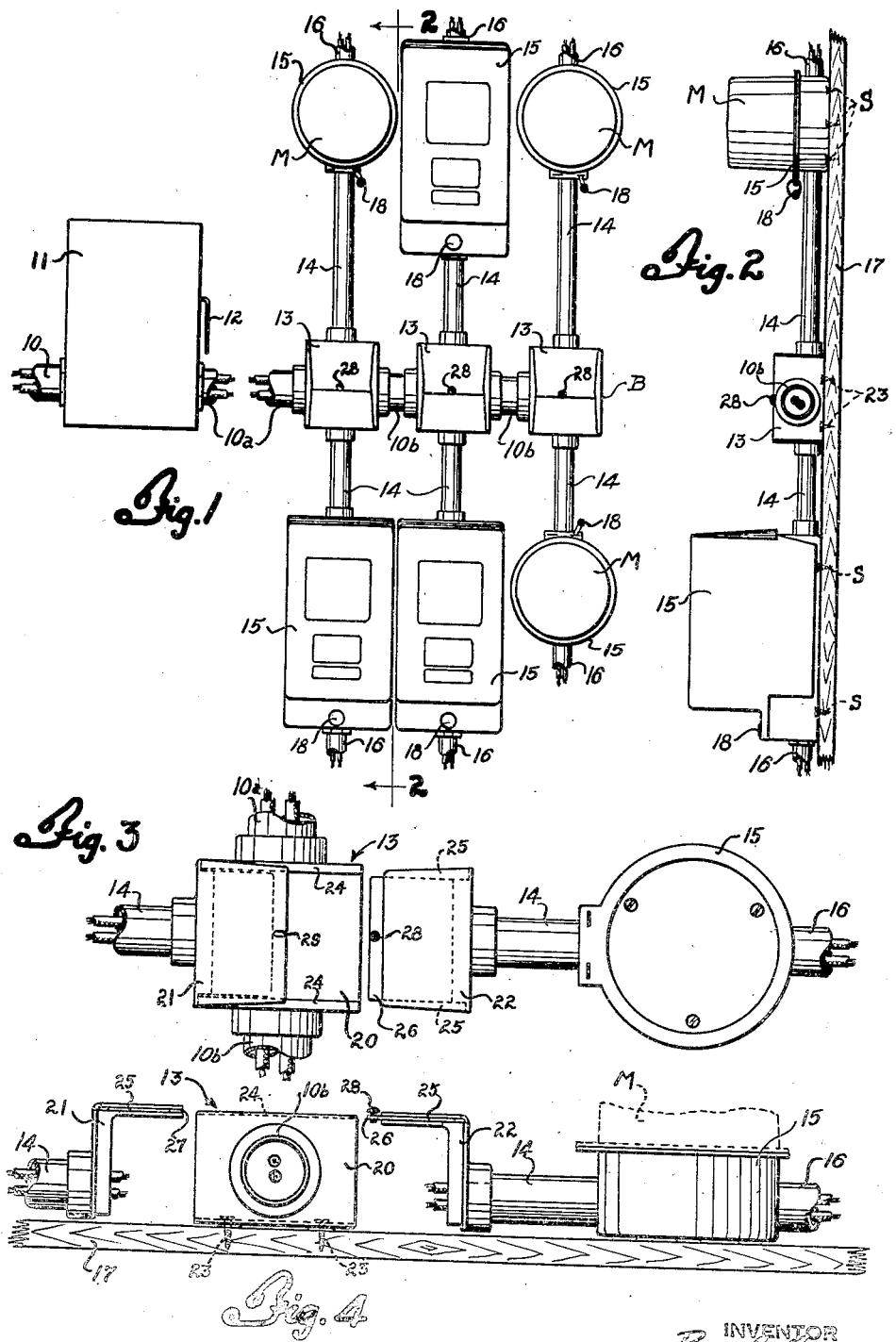

ELECTRICAL DISTRIBUTION SYSTEM

Filed March 27, 1936  2 Sheets-Sheet 2

INVENTOR
Roy C. Fryer
BY
ATTORNEY

Patented July 26, 1938

2,124,693

UNITED STATES PATENT OFFICE 2,124,693

ELECTRICAL DISTRIBUTION SYSTEM

Roy C. Fryer, Cincinnati, Ohio, assignor to The Orion Electric Company, Wilmington, Del., a corporation of Delaware Application March 27, 1936, Serial No. 71,150

7 Claims. (Cl. 247—9)

This invention relates to electrical distribution systems, more particularly to systems in which protective devices are employed to prevent tampering with the connections of the circuits.

In order to prevent unauthorized tampering with electrical circuits, particularly to prevent the bypassing of electrical current around metering devices, a protective device is contemplated in this invention which will preclude any change in the circuits without breaking sealing devices. The invention contemplates a method whereby this purpose is accomplished cheaply and with simplicity, so that the installation of the protective devices is easy and effective.

It is, therefore, an object of this invention to provide a connection box for a bus conduit of an electrical distribution system to supply outlets for feeder conduits which will protect the circuit connections from unauthorized tampering by completely enclosing the same and positioning the cooperating parts thereof together under seal.

It is a further object of this invention to provide a sealed connection box for protecting bus and feeder conduit circuits from unauthorized tampering, the box being readily installed and cheap to manufacture.

It is a further object of this invention to provide effective protective devices for bus and feeder conduit circuits, the component parts of which can be fabricated by the simplest manufacturing processes.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Fig. 1 is a front elevation of a distribution system in which the invention is being utilized.

Fig. 2 is an elevational view taken along the line 2—2 of Fig. 1.

Fig. 3 is an enlarged view of the connection box partially exploded.

Fig. 4 is an enlarged side elevational view, exploded to show the component parts of the connection box.

Figures 5, 6:
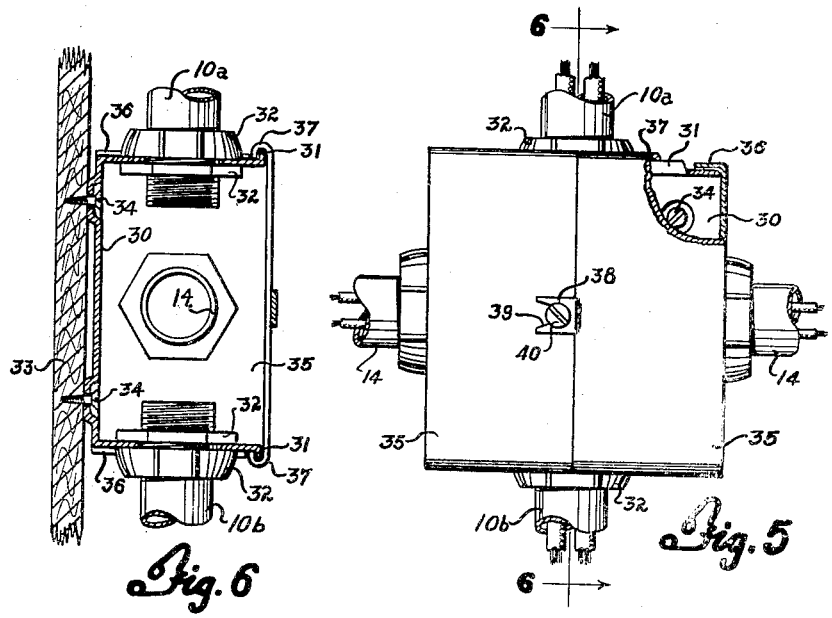
Fig. 5 is a plan view, partly in section, of a modification.
Fig. 6 is a sectional elevation taken along the line 6—6 of Fig. 5.

Referring to Fig. 1 of the drawings there is shown an electrical distribution system to which the invention about to be disclosed may be applied with advantage. Beginning on the left of the drawing, a supply conduit 10 is in communication with a metal case 11 containing circuit protective devices, such as circuit breakers, fuses and the like. These protective devices may be of any suitable type depending upon the characteristics of the circuit. Manual operable means 12 may be provided outside the case 11, if desired. Bus supply lines in circuit with a power supply are placed in the conduit 10 and connected to the circuit protective devices.

An outlet bus conduit 10a is supplied to carry the supply busses through a series of connection boxes 13 to be described in detail hereinafter, the boxes 13 being in communication with each other through nipples 10b. The conduits and nipples may be fitted to these fixtures by being threaded into bosses or by being fitted with a pair of threaded lock nuts to cooperate with a threaded portion on the conduit, or by any other means well known in the art.

Feeder circuits are connected to the supply busses in the connection boxes 13 being disposed laterally from the supply conduit 10 and protected by feeder conduits 14 which carry the feeder circuits to appropriate metering devices 15. From the metering devices, the feeder circuits may be conducted to controlling and/or loading devices (not shown) through the conduits 16. The whole assembly may be connected to a suitable base as, for example, a baseboard 17, which may be carried by a wall or any other suitable support.

The metering devices 15 may be enclosed in box protective envelopes or may be provided with enclosure bases as desired, both types are well known in the art and need not be described in detail. These typical protective envelopes prevent tampering with the circuit connections or with the mechanism, and are provided with sealing devices 18 to indicate whether or not any tampering has occurred.

Referring to Figures 3 and 4, the constructional details of a typical connection box are shown. The box comprises generally a channel-shaped member 20, which forms the fixed member, and two L-shaped members 21 and 22 cooperating therewith to form the enclosure. The base of the channel-shaped member 20 is provided with apertures whereby the member may be fixed to the base board 17 by means of screws 23. The side portions of the channel-shaped member may be provided with suitable knockouts to provide a means of entry for the conduits 10, or threaded bosses may be provided as desired. Threaded bosses are shown in the drawings, but as knockouts are well known in the art, any skilled man may substitute them in their place.

The upper ends of the side portions of the channel-shaped member 20 are provided with inwardly turned flanges 24, which form a component part of an interlock between the channel-shaped member 20 and the two L-shaped members 21 and 22.

The L-shaped members 21 and 22 cooperate with each other and with the channel-shaped member 20 to form an envelope or enclosure to protect the connection between the bus lines and the feeder lines from tampering. The depending sides of the L-shaped members are provided with suitable conduit entry means, either by knockouts or bosses similar to those employed in the channel member described above, to accommodate the feeder conduit 14. The edges of the L-shaped members are provided with grooves 25 to cooperate with the inwardly turned flange 24, so as to provide an interlock between the channel shaped member and the L-shaped members. The cooperating edges of the L-shaped members 21 and 22 are also provided with an interlock in the nature of a tongue 26 and groove 27, positioned on their abutting edges, with a locking device being provided by means of a screw 28 and cooperating slot 29. In this way a complete protective enclosure is obtained, wherein the L-shaped members are placed into cooperative position with the channel-shaped member by sliding the flange 24 into the grooves 25 till the tongue 26 is in position in the groove 27, and locking the parts in position by the screw 28. A further sealing is obtained of these cooperative parts by a novel action to be described hereinafter in the use of the connection box.

The connection box is installed and employed in a distribution system as follows: The bus supply lines are threaded through the bus conduit 10 into the box 11 where the circuit protective devices are situated, thence through the bus conduit 10a in the connection box 13, which at this time comprises only the channel-shaped member 20 fastened permanently to a base by the screws 23, thence through the nipples 10b into a whole series of channel-shaped members, the number of boxes to be used depending upon the characteristics of the system. The last box in the group may conveniently have one blank wall B, or if desired, a metering device may also be attached in this wall.

With the bus lines in position, feeder circuits are connected to the bus lines in the gaps of the protective conduit provided by the open channel-shaped member. This connection may be made in any convenient manner and need not be described in detail. Thereafter, the feeder lines are threaded into the feeder conduits 14, which have already been cut to a suitable length and have had an L-shaped member 21 attached to one end and a meter protective device 15, either a base type or an envelope attached to the other end. This assembly is placed in cooperative position with the channel-shaped member 20 by placing the flanges 24 into the grooves 25, and then the fastening screws S are driven to hold the metering protective device in position on the base 17. Since the parts 15, 14 and 21, are rigidly fastened together, the screws S will prevent the removal of the assembly from its operable position with the channel-shaped member 20.

In a similar manner the other L-shaped member 22 is placed in position from the opposite side of the channel-shaped member 20, the screws S here also preventing the removal of the assembly. The screw 28 is then put in position to further lock the parts in position. The other connection boxes 13 are attached to the protective system in the same manner.

The whole system is then sealed through the agency of the sealing devices normally used on the meter protective means 15 and the meter M, or on the envelopes themselves, here indicated by the character 18. These seals prevent unauthorized entry into the interior of the protective means 15, which clearly prevents tampering with the screws S. To enter the connection box 13, lateral movement of the L-shaped members 21 and 22 is necessary, and since the screws S prevent this and the screws being inaccessible by being located on the interior of the protective means 15, the whole system is given ample protection from tampering.

*Modifications*

In Figures 5 and 6 there is shown a modification of the present inventions, in which there is provided a channel-shaped member 30 having on the upper ends of its vertical sides outwardly struck flanges 31. The vertical sides of the channel-shaped member 30 are provided with knock-out holes to form an entry for the bus conduits 10a and 10b, the conduits being fastened in any convenient manner as, for example, by means of two lock nuts 32. The channel-shaped member may be fastened to a base board 33 by means of screws 34 which are threaded through apertures in the base portion.

The channel-shaped member 30 is provided with two L-shaped members 35 in the same manner as in the modification described above. The depending portions of the L-shaped members are also supplied with knock-outs which allow entry from the feeder conduits 14 into the connection box in the manner similar to the one described above. The depending sides of the L-shaped member 35 are further provided with inwardly struck flanges 36 which are fitted to cooperate with the outside of the vertical portions of the channel-shaped member 30. The other branch of the L-shaped member is provided with a turned-back flange 37 which embraces the outwardly turned flange 31 upon the vertical portion of the channel. As shown in Figure 6, this forms a cooperative relation between the L-shaped member 35 and the channel-shaped member 30, the channel-shaped member and the two L-shaped members cooperating together make a complete enclosure. The L-shaped members cooperate with the channel by moving into co-operation therewith from a lateral direction so as to engage the turned-back flange 37 with the outwardly turned flange 31. One of the L-shaped members 35 is provided with an ear 38 having a slot 39 which cooperates with a screw 40 positioned on the opposing L-shaped member, the interaction of the screw and the slotted ear locking the two parts in position.

The operation and method of installation of this modification is similar to the one already described.

Figures 7, 8:
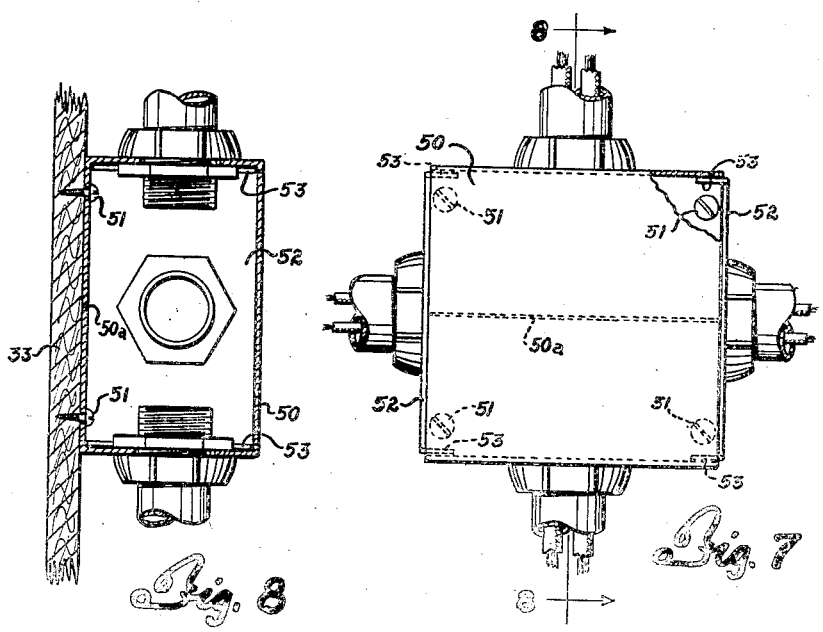
Fig. 7 is a plan view, partly in section, of another modification.
Fig. 8 is a sectional elevation taken along the line 8—8 of Fig. 7.

In Figures 7 and 8 there is shown another modification of this invention in which there is provided an open-ended box construction 50, which may be made of sheet material with a butt joint 50a as shown in the drawings or it may be formed of a tube of metal. The sides of this box-like construction are provided with knock-outs similar to those already described in the other modifications in order to allow entry of the bus conduits into the connection box. A box 50 may be attached to a base board 33 by means of screws 51 threaded into apertures relatively close to the open ends of the structure so that the heads thereof may be easily accessible to a workman while attaching the same to the base-board.

In order to form a complete enclosure cap-like portions 52 are provided to fit into the open ends of the box-like structure 50. The base portions of the cap-like portions are provided with knock-out portions to provide entry for the feeder conduits, the base portion extending in a vertical direction sufficiently to over-lap the sides of the box-like structure 50 to prevent the cap-like portion from entering into the inside of the box-like structure. Inwardly struck flanges 53 are provided on the sides of the base which enter into the enclosure of the box-like structure and prevent lateral motion thereof.

The mode of installation and operation in this case is similar to that of the other modifications, in this case, however, the connections must be made with the supply lines drawn outside of the box.

The last two modifications are designed for fabrication from sheet material and with simple forming steps which facilitate and cheapen the manufacturing process.

It is to be understood that the above description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

I claim:

1. In an electrical distribution system in combination with a conduit system interconnecting the protective and metering devices of the distribution system, a distribution box to protect the tie point of lateral circuits to the main bus, comprising a channel-shaped member to form three sides of the box, L-shaped members cooperating with the channel-shaped member to form the other sides of the box, and means cooperating with the aforementioned members to lock the enclosure in position.

2. In an electrical distribution system protected by conduit, a bus conduit, feeder conduits cooperating with the bus conduit to supply lateral circuits, and a protective chamber positioned at the point of cooperation of the bus conduit and the feeder conduits, formed of a channel-shaped member to define three sides of the chamber and two L-shaped members to define the other sides.

3. In an electrical distribution system having a bus conduit and feeder conduits to supply lateral circuits, a protective connection box in the bus conduit, comprising a fixed channel-shaped portion in the bus conduit, movable L-shaped portions cooperating with the feeder conduits, the fixed and movable portions coacting to form the connection box, the movable portions coacting with the fixed portion through movement in one plane.

4. In a protective connection box for electrical distribution systems, a base portion, flanged side portions extending upwardly from the base portion, L-shaped portions to complete the box having grooves on a branch thereof to cooperate with the flanges on the side portions, and holding means to fasten the portions in position.

5. In an electrical distribution system having a bus conduit, feeder conduits with sealed terminal enclosures, a protective connection box between the bus and feeder conduits comprising a channel-shaped portion to form three sides of the box, the bus conduits entering the box therethrough, two L-shaped portions cooperating with the feeder conduits and adapted to enter into locked relation with the channel-shaped portion by movement in one plane to form the other sides of the box, and means in the sealed terminal enclosures on the feeder conduits to prevent movement of the L-shaped portions in said plane.

6. In a protective connection box for electrical distribution systems, a channel-shaped base portion, L-shaped portions to cooperate with the channel-shaped portion, one branch of each L-shaped portion closing an end of the channel-shaped portion and the other branches thereof forming a cover for the channel-shaped portion, means cooperating with the channel-shaped portion and the L-shaped portions to interlock the parts of the box, the L-shaped portions being adapted to cooperate with the channel-shaped portion for interlocking relation by movement in a lateral direction relative to the channel-shaped portion.

7. In an electrical distribution system protected by conduit, a bus conduit, feeder conduits cooperating with the bus conduit to supply lateral circuits, a protective chamber positioned at the point of cooperation of the bus conduit and the feeder conduits formed of a fixed member cooperating with the bus conduit having right-angle parallel bends to define several sides of the box, members cooperating with the fixed member to complete the box by movement in a predetermined line in a direction longitudinal of the apex of the bends of the fixed member, means to hold the members forming the box in cooperative relation, and means to seal the members in position.

ROY C. FRYER.